(12) United States Patent
Lindgren

(10) Patent No.: US 6,732,469 B2
(45) Date of Patent: May 11, 2004

(54) UNDERWATER BATTERY POWERED LIGHTED FISHING LURE

(76) Inventor: Peter B. Lindgren, 2499 SE. 8th St., Pompano Beach, FL (US) 33062

( * ) Notice: Subject to any disclaimer, the term of this patent is extended or adjusted under 35 U.S.C. 154(b) by 0 days.

(21) Appl. No.: 10/232,299

(22) Filed: Aug. 30, 2002

(65) Prior Publication Data

US 2003/0005615 A1 Jan. 9, 2003

Related U.S. Application Data

(62) Division of application No. 09/580,142, filed on May 30, 2000, now Pat. No. 6,481,148.
(60) Provisional application No. 60/157,821, filed on Oct. 5, 1999.

(51) Int. Cl.[7] .............................................. A01K 85/01
(52) U.S. Cl. ...................... 43/17.5; 362/158; 362/276
(58) Field of Search .............................. 43/17.5, 17.6, 43/4; 362/158, 184, 276, 802, 267, 205

(56) References Cited

U.S. PATENT DOCUMENTS

| | | | |
|---|---|---|---|
| 2,552,224 A | 5/1951 | Setterblade | 43/17.6 |
| 3,502,861 A | 3/1970 | Evans | 43/17.5 |
| 3,559,224 A | 2/1971 | Shimizu | 362/158 |
| 3,576,987 A | 5/1971 | Ridgefield et al. | 362/34 |
| 4,109,405 A | 8/1978 | Ito | 43/17.5 |
| 4,114,187 A | 9/1978 | Uke | 362/158 |
| 4,234,913 A | 11/1980 | Ramme | 362/158 |
| 4,291,484 A | 9/1981 | Young | 43/17.5 |
| 4,437,256 A | 3/1984 | Kulak | 43/17.5 |
| 4,441,142 A | 4/1984 | Garofalo | 362/158 |
| 4,458,439 A | 7/1984 | Garrett, Sr. | 43/17.6 |
| 4,598,346 A | 7/1986 | Bodde | 362/267 |
| 4,697,374 A | 10/1987 | Simms | 43/17.5 |
| 4,757,631 A | 7/1988 | Anson-Smith | 43/17.5 |
| 4,811,513 A | 3/1989 | Grobl | 43/17.6 |
| 5,003,719 A | 4/1991 | Whitlock et al. | 43/17.5 |
| 5,067,051 A | 11/1991 | Ladyjensky | 362/34 |
| 5,070,437 A | 12/1991 | Roberts, Sr. | 362/158 |
| 5,076,003 A | 12/1991 | Chen | 43/17.5 |
| 5,213,405 A | 5/1993 | Giglia | 43/17.5 |
| 5,299,107 A | 3/1994 | Ratcliffe et al. | 43/17.6 |
| 5,351,432 A | 10/1994 | Tse | 43/17.5 |
| 5,622,422 A | 4/1997 | Rodgers | 362/158 |
| 5,915,941 A | 6/1999 | Casey | 43/17.5 |
| 5,983,553 A | 11/1999 | Gordon | 43/17.6 |
| 6,203,170 B1 | 3/2001 | Patrick et al. | 362/158 |
| 6,280,049 B1 * | 8/2001 | Tam | 362/158 |
| 6,445,132 B1 * | 9/2002 | Ford | 362/205 |
| 6,471,366 B1 * | 10/2002 | Hughson et al. | 362/158 |
| 6,481,148 B1 * | 11/2002 | Lindgren | 43/17.5 |

OTHER PUBLICATIONS

K–light product C58–02051 Capt. Harry's Fishing Supply catalog, Jan. 2000, Miami, FL.

* cited by examiner

Primary Examiner—Darren W. Ark
(74) Attorney, Agent, or Firm—Robert C. Kain, Jr.; Fleit Kain

(57) ABSTRACT

The underwater battery powered lighted fishing lure includes, in one embodiment, a transparent housing, a battery in a battery cavity and one light emitting device (preferably, an LED). The battery may have a substantially light reflective surface. The transparent housing has light refraction surfaces, may have one or more light modifiers (glitter, bubbles, glass beads). As a result, the fishing lure emits light in all three dimensions (x, y and z) due to light refraction and light reflection (from the battery). Preferably, the lighted fishing lure includes two LEDs and two offset batteries. The lighted fishing lure may further include a pressure sensitive switch. In one embodiment, the lure has at least a two way control (ON-OFF) and in another, a three way control (ON-OFF- and ON when the ambient pressure exceeds a predetermined pressure underwater).

19 Claims, 8 Drawing Sheets

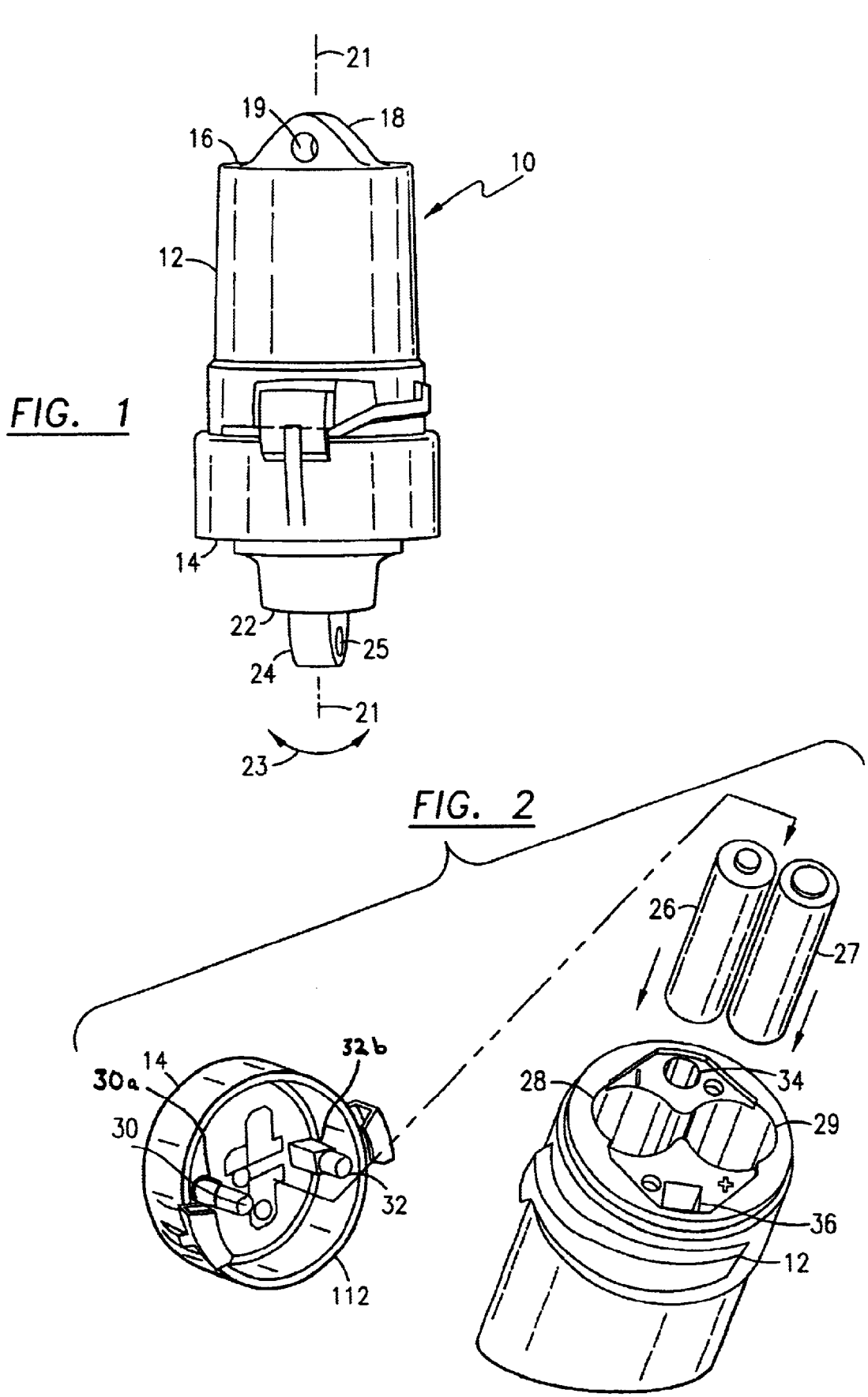

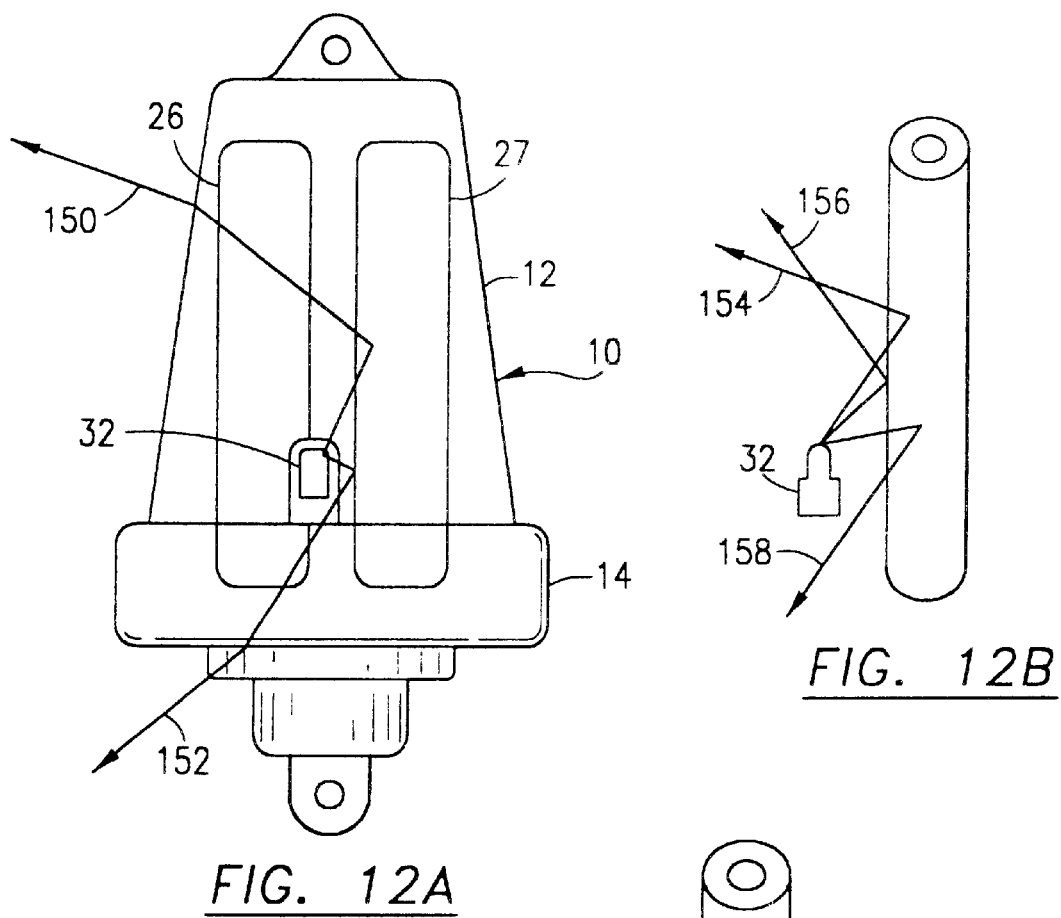
FIG. 12A
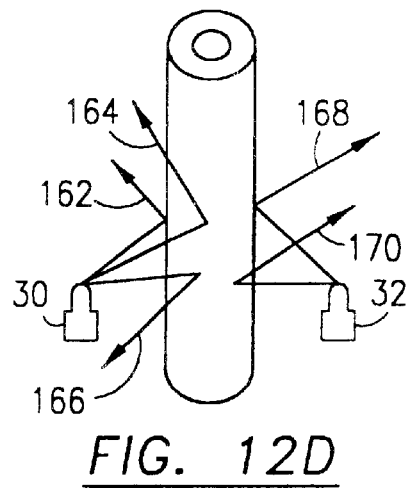
FIG. 12B
FIG. 12D
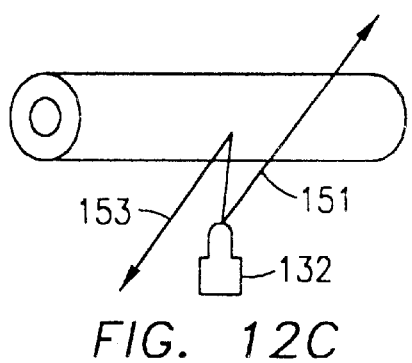
FIG. 12C

UNDERWATER BATTERY POWERED LIGHTED FISHING LURE

The present application is a divisional application based upon patent application Ser. No. 09/580,142 filed May 30, 2000, now U.S. Pat. No. 6,481,148, which was a regular patent application based upon provisional patent application Serial No. 60/157,821 filed Oct. 5, 1999.

The present invention relates to an underwater battery powered lighted fishing lure and a method therefor.

For many years fishermen throughout the world have practiced the art of using light for squid and bait fishing. It is well founded that many species of fish will be attracted to artificial light placed in or directed toward the water at night. In the mid 1970's when Cuban fisherman deployed lights in the form of smudgepots to keep track of their equipment, they discovered that the catch of swordfish increased in the lit region about the lights. It was not long after this discovery that the longline fishing industry became the largest user of underwater lights for fishing.

Dating to the $19^{th}$ century, "longlining" has been used primarily by fishermen searching for tuna and swordfish. The longline consists of a main line to which many leader lines are attached. The main is supported by buoys and can stretch for over 100 miles. Since swordfish are primarily night feeders, the leader lines usually include some type of light, a bait such as squid and a hook. The typical longliner may use as many as 1200 lights per set or main line. Once the use of lights for catching swordfish caught on all types of different lights were deployed. A good example of the first type of lure used was to simply drop a battery light inside a sealed glass jar. Later the favored art evolved into the use of a plastic incandescent light manufactured in Japan. It consisted of a clear two piece acrylic design containing a single 1.5 volt AA battery with a flashlight bulb mounted inside the top. Known as the Japanese light, when the top was screwed into the base the battery made contact activating the light thus becoming the on/off switch. A single O-ring seal was used between the two halves to form a watertight seal when the light was activated. While this type of light was popular, it encountered several problems while in service. One of the first problems was the cost of replacement batteries. Due to the electric current draw of the incandescent bulb, battery life would only prove to be adequate for one night's use. Another problem was that while the O-ring seal was effective once the light was activated, as soon as it was turned off pressure against the ring was released thereby allowing water and moisture to enter the light. The constant maintenance, replacement of batteries, and the ongoing need to ensure good electrical contacts made for an unreliable and labor-intensive product. These problems, along with the competition created by the expiration of patents for chemical lights, slowly eliminated the use of battery lights.

As fishermen experimented with other light sources, it was discovered that chemical lights proved effective when placed just above the bait. Not long afterwards these lights quickly became the lights of choice among the sword fishing industry.

The most popular producer of chemical light during this time was American Cyanamid. In the 1970's they developed and marketing chemical lights for use mainly by the military. Patents include U.S. Pat. No. 3,576,987 by Heinz Voight and Robert Meyers, "Chemical Lighting Device to Store, Initiate and Display Chemical Light," U.S. Pat. No. 5,067,051 by Jacques Ledyjensky, Chemiluminescent Lighting Element, U.S. Pat. No. 5,213,405 by Robert Giglia, "Lightstick with Line Attachment." This collection of chemical light stick patents is only a small representation of a much larger group.

The art of chemiluminesence is well documented, being devised from the mixing of a combination of chemicals to produces light. In a lightstick, this mixing is accomplished by bending the light which ruptures an internal ampule and allows the activator and oxalate chemicals to mix. The success of light sticks for swordfishing was due to the simplicity of the product itself. All a fisherman had to do to activate the light was bend the stick, attach it to the fishing line, and send it overboard. Since the lights were only good for one night of fishing they were simply collected and disposed of at the end of the night. Despite the expense, the timesaving and reliability offered by chemical lights offset the initial high cost. As the product cycle continued and the protection of patents expired, competition increased thereby allowing prices to drop to their current levels in the later part of the 1990s. Although these prices have helped to discourage development of alternate types of fishing lights, recent environmental concerns and the advance of alternative efficient light sources are putting pressure on the industry to come up with better solutions. The discarding of spent light sticks is one of these concerns. Chemical lights give off carbon dioxide gas during their activation and as such the sticks float indefinitely until they are either collected or washed on shore. It is not uncommon to find beaches littered with light sticks that have been illegally dumped at sea or have accidentally detached from their fishing lines.

In addition, there is a new environmental concern with regards to sea birds such as the Pacific Albatross. According to Katherine L. Cousins in a recent paper presented to the Western Pacific Regional Fishery Management Council titled MARINE POLLUTION: A SERIOUS PROBLEM FOR BREEDING ALBATROSS, "Concern has been expressed regarding the numerous light sticks and cigarette lighters found in the remains of albatross chicks on the Northwestern Hawaiian Islands. Adult seabirds ingest plastic items while foraging for food at-sea and then inadvertently feed the plastic to their young. Albatrosses tend to follow ships, and as opportunistic foragers, they quickly learn that the ships can be a source of food. Plastic garbage lost intentionally or unintentionally from ships could easily be the source of their plastic in the marine environment." Since the short-tailed albatross is listed on the endangered species list, there is an increasing threat that the areas these birds occupy might be closed completely to commercial fishing unless this problem is eliminated.

Recent attempts to offer an alternative to chemical light sticks in the commercial fishing market have not been successful. U.S. Pat. No. 4,598,346 by Gerald Boddie, "Submersible Fishing Light", now expired, discloses an incandescent fishing light combined with a ballast to make the light sink. This patent disclosure uses an external battery source such as a 12 volt car battery secured by alligator clips. Similar to the Japanese light, the current requirements of this type of light make it too expensive to operate in comparison to chemical light. Also the use of an external power source would make this light unpractical for longlining operations. U.S. Pat. No. 5,070,437 to Joseph Roberts, "Electrical Light for Underwater Use" now expired, discloses an LED light that is activated by flexing the lead of the LED to engage the battery and activate the light. It includes a threaded cap with an O-ring to seal water out and allow for the replacement of batteries. It also includes a snap ring for attachment to a fishing line. A lighted fishing lure designed in accordance with this patent would need to be quite large. Since it only illuminates light directed forward of the battery compartment, it would either require a long light guide as a means of distributing light or it would offer a very narrow viewing angle from the LED itself. U.S. Pat. No. 5,076,003 to Yung-Haung Chen, "Light Device for an Artificial Lure", now expired, discloses a lure having a transparent tubular chamber with an electrical light-emitting device. For commercial uses, this type of arrangement would be susceptible to breakage and would be difficult to handle. It also discloses the use of button type batteries that have low miliamp hour life and can be difficult to find in many parts of the world. All of these devices seem to have been created for the occasional, light duty use by recreational fishermen. They do not meet the needs of the commercial longline fisherman and the intense pressures reached when fishing to depths of over 1,000 feet.

U.S. Pat. No. 5,076,003 to Chen discloses a light device for artificial fishing lure. The Chen '003 patent disclosure describes an LED mounted in a transparent tube having a reflector mounted opposite the LED in the tube. The battery is located behind the LED and hence does not reflect light emitted by the LED. Notches are formed in the transparent tube which reflect LED light traveling through the tube. A reflector placed opposite the LED in the tube reflects light from the LED.

U.S. Pat. No. 5,070,437 to Roberts discloses an electrical light for underwater use. The Roberts '437 patent disclosure includes an LED with a battery located behind the LED and a transparent cap. Light is emitted from the front end of the cap in a forward directed beam.

U.S. Pat. No. 5,299,107 to Ratcliffe discloses an illuminating fishing lure having a non-transparent and light blocking rear housing. U.S. Pat. No. 5,915,941 to Casey discloses a lighted fishing bobber which emits light only through a light pipe at the top end of the bobber. U.S. Pat. No. 5,983,553 to Gordon discloses a lighted fishing lure having a generally cylindrical shape which emits light beams perpendicular to the axial center line of the lure.

OBJECTS OF THE INVENTION

It is an object of the present invention to provide an underwater battery powered lighted fishing lure and a method therefor.

It is another object of the present invention to provide a lighted fishing lure that emits light, 360 degrees and in all three directions, along its x axis, y axis and z axis.

It is a further object of the present invention to provide a lighted fishing lure which reflects, refracts and defuses light in order to emit light in all directions.

It is an additional object of the present invention to provide a lighted fishing lure which is sized such that birds cannot swallow the lighted lure.

It is another object of the present invention to provide a lighted fishing lure which has a negative buoyancy in sea water.

It is a further object of the present invention to provide a lighted fishing lure which automatically turns ON when the lure is exposed to a certain pressure underwater.

It is a further object of the present invention to provide a tri-modal control for a lighted fishing lure that turns the lure ON in one control mode, turns the lure OFF in a second control mode and establishes a pressure sensitive switch in a third control mode.

SUMMARY OF THE INVENTION

The underwater battery powered lighted fishing lure includes, in one embodiment, a transparent housing having at least one battery cavity and at least one light emitting device cavity, a battery disposed in the battery cavity and a light emitting device disposed in the device cavity. Preferably, the light emitting device is an LED (light emitting diode). The battery in this embodiment has a substantially light reflective surface. An electrical circuit couples the battery and the LED. The transparent housing has light refraction surfaces therein and one or more light modifiers from the group of light diffusing optical elements dispersed in said housing and light reflecting material dispersed in the housing. As a result, the lighted fishing lure emits light in all three dimensions (x, y and z) due to light refraction, light reflection from at least the battery and light dispersion caused by one of the diffusing elements or reflecting material dispersed throughout the housing. Other embodiments include a battery with or without light reflective surface, light diffusing elements in the form of beads, rods or fibers (preferably glass) and light reflecting material such as glitter. The light diffracting elements may be bubbles or voids in the housing. The glass elements or voids have a different index of refraction as compared with the index of refraction of the transparent housing. Preferably, the lighted fishing lure includes two LEDs and two batteries which are all disposed at offset positions with respect to an axial centerline through the generally frusto-conical shape or generally cylindrical shape of the housing. The lighted fishing lure may further include a pressure sensitive switch. In a working embodiment, the lure has a three way or tri-modal control which enables the LED to be turned ON in one mode, OFF in a second mode and in a third mode, placed in a pressure sensitive switch condition such that the LED is turned ON when the ambient pressure exceeds a predetermined pressure underwater. The ambient pressure is sensed by a pressure sensitive control surface. The method of illuminating an underwater battery powered lighted fishing lure includes the steps of refracting light traveling from the LED through the housing, reflecting light from the LED off the battery, providing at least one of a light diffusing element and/or glitter deployed within the housing and either diffusing LED light or reflecting LED light from the diffusing element and/or glitter thereby causing the fishing lure to emit light in all directions by refraction, reflection and diffusion or further reflection from the light diffusion element (glass or voids) and/or glitter, respectively.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates the underwater battery powered lighted fishing lure;

FIG. 2 diagrammatically illustrates a partial, exploded view of the underwater battery powered fishing lure with the batteries extracted from one of the two body parts forming the housing;

FIGS. 12A, 12B, 12C and 12D diagrammatically illustrate reflection characteristics of the housing, a single LED and single battery, a single LED and a transversely disposed battery, and two LEDs and two batteries in accordance with the principles of the present invention;

DETAILED DESCRIPTION OF THE PREFERRED EMBODIMENTS

Figure 3:
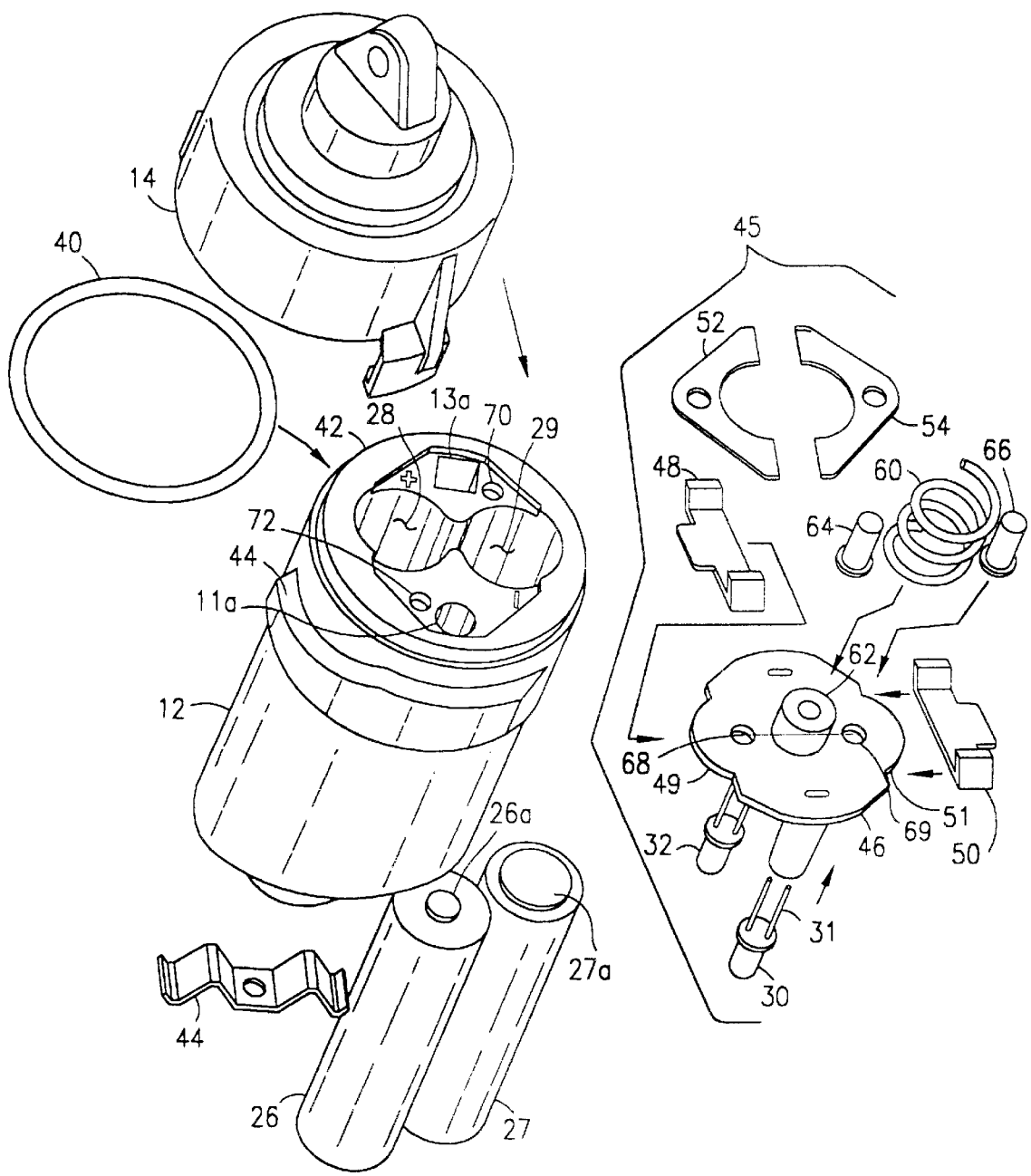
FIG. 3 diagrammatically illustrates a partial, exploded view of primary components of one embodiment of the lighted fishing lure.

The present invention relates to an underwater battery powered lighted fishing lure and method therefor.

There is a need for a reusable, negative buoyant and cost effective means of providing a light for use in a commercial fishing environment. In order for the replacement light to become the state of the art in the longline industry, it must offer long life, low operating costs, and extreme durability that will exceed current standards. Careful attention must be paid to the materials selected and the ability of the material to offer both a high level of transparency while withstanding deep underwater pressures. All of this must be done within labor and cost constraints of current technology. To do so, the present invention incorporates the following design elements:

Inexpensive and Readily Available Power Source
360 Degrees of Illumination about the x, y and z fishing lure axis
Duplicate or better the light curves as compared with chemical lights (Lux vs. Time)
Compact Size
Negative Buoyancy
Durability
UV Resistant
Waterproof to over 1,000 feet
Means to Attach the Lure to a Leader Line
Environmentally Friendly
Cost Effective both in Production and Maintenance Alkaline, lithium, nickel cadmium, and polapulse™ batteries were all tested in various sizes, voltages and configurations. After careful evaluations of the above criteria, various load studies, and disposal considerations it was determined that a two battery, two light configuration offers the best initial arrangement given the light source chosen. Later a three battery three light design incorporating an advanced electrical circuit configuration may be produced. Both designs offer the necessary voltage, miliamp hour life, and compact size required while bettering the light output of a chemical light. Prototype designs were created which used the surface area of the batteries as a reflective screen to project and reflect light. Battery weight and the minimization of air space was utilized as a means to increase the negative buoyancy of the light. In order to provide maximum battery life and a low operating cost the idea of an auto feature, which only turns the light ON after a predetermined depth was incorporated into the present invention.

Clear polycarbonate was initially chosen as the raw material for the lure's housing based on its combination of its cost, clarity and strength. Upon further testing it was found polycarbonate reacts poorly with battery acid and sometimes fails. Other plastics or polymers such as PVC may provide both the clarity and strength of polycarbonate but are also are resistant to acid. To help distribute or disburse light throughout the polymer housing, a host of additives including plastic flakes, metals and glass were utilized. Glass beads gave the best overall results, being compatible to the injection molding processes from which the housing is manufactured. Any of these materials may be added to the housing. In addition, a UN or ultraviolet stabilizer is added to help increase the plastic's resistance to ultraviolet light.

To correct the design deficiency of the prior battery light art that allowed moisture to enter when the light is OFF, the new design of the present invention has a twin O-ring feature. The first ring is positioned across the width of the base in a grove which seals between the side of the base with the cap or top. This primary seal keeps water and moisture out of the light regardless of whether the light is in the ON, AUTO or OFF position. The second seal is effective when the light is in the ON position or while under pressure. The second seal is an O-ring positioned in the cap or top which seals against the top of the base. This added seal offers additional protection while the light is under the stress of ocean depths.

Eventually, light-emitting diodes, commonly referred to as LEDs, were selected for the lighted fishing lure. In recent years there has been tremendous strides in the intensity and color range offered by these lights. Since LED's operate on DC voltage, this makes them ideally suited to battery use. However, the ideal voltage for an LED is determined by the physical properties of the materials used in the LED and cannot be altered by filament construction such as is possible with incandescent light. Through the use of resistors, the power source voltage can be adjusted down but this in turn results in a loss of efficiency through the resistor. By carefully selecting the LED, its color, its manufacturer and a complementary battery, the need for any type of specialized circuitry is eliminated and thus maximizes the efficiency of the current being consumed by the system. The selection was made after long term studies of light output vs. power consumption based on the given power source. In addition, LED size and shape was analyzed to determine the best possible pattern available for this specific application.

Design Features:

The body design incorporates three operational functions.

Manual—rotate cap to ON position for continuous operation

Auto—rotate cap to AUTO position where light remains OFF until water pressure greater than a predetermined level automatically activates the light. By manually pressing the cap into the body while the light is in the AUTO position the operator check to ensure the light is functional. Once the light is brought back close to the surface, the water pressure decreases and it automatically turns OFF. Keeping the light in the AUTO position will ensure the longest possible battery life.

OFF—with the cap rotated to the OFF position the cap is held in place while being sealed from the elements while the light remains OFF.

Environmentally Sound—Unlike chemical lights, the present invention is not a consumable item, instead it uses standard AA batteries that are readily available and are easily replaced as its power source. Typical longline operators fish from 5 to 20 sets per trip with an average gear immersion time of 10 hours per set. The current design of the present invention allows for constant illumination substantially over the 200 hours required between trips with a light output well above the average Lux readings of light sticks. The extended life greatly discourages illegal battery dumping at sea as batteries will not need to be changed until the boat returns from its trip. This solves the environmental problems associated with spent chemical lights. Since alkaline batteries are considered a non-hazardous waste under the strict Federal EPA guidelines they can be disposed with standard trash once the longliner returns to port.

Efficient Light Source—The current invention produces light from super efficient light-emitting diodes. They have an extremely low current draw greatly increasing the duration between battery replacement. There is also the added benefit that the light produced can be of single or multiple of colors. Since the color of an LED is a function of the raw materials used in its composition and of the wavelength of light created, there are no losses associated with filters used by incandescent light when offering colors other than white. The same holds true with losses through heat. LEDs produce cool light without the energy losses associated with heat production in typical incandescent bulbs. LEDs are extremely durable and are resistant to failure through shock or breakage as the light is fully encapsulated. Finally, LEDs offer life spans of up to 100,000 hours of continuous light, making the need to design packaging for lamp replacement unnecessary and failure while in service nearly impossible. LEDs used in this invention operate at voltages well under their allowable limit so overall life is maximized.

Negative Buoyancy—the new light's components are manufactured from a material with a specific gravity greater than that of salt water. Typically, the weight is in the housing and the batteries. Also, the internal structure of the light is produced with a minimum of air space to further reduce buoyancy. This combination of spacial orientation and specific gravity characteristics produces a light that if accidentally lost at sea the lighted lure simply sinks to the bottom of the ocean where it does not pose a threat to bird life. The use of very high specific gravity filler may also be used in at least one part of the light, such as the cap or top, to further improve the sinking rate.

Exterior and Cavity Shape—the lighted fishing lure is designed in such a manner that its size makes it virtually impossible for birds to insert them into their chick's throats. At the same time, its short shape makes it easy to handle and store when not in use. The design of the cavity within the base acts as a screen for the LED to project its beam upon.

Material Composition—While the invention is made out of a clear plastic it could include a filler material such as high refractive index glass beads blended within the plastic. Since LEDs offer a limited range of visibility, for example 30 or 60 degrees in a single forward direction, two materials with different indexes of refraction increase the amount of light bending and traveling throughout the housing of the present invention. This increases its visibility, mimicking the illumination offered by chemical and other natural and artificial light. Additionally, a blowing agent can also be added to cause small air bubbles to be trapped within the polymer housing giving an iridescent look to the light. The air bubbles further refract the light.

Two Light Sources—The current invention offers a 2 LED design to help eliminate any dark areas created by the batteries and providing 360 degrees of illumination about the lure's x, y and z axis while keeping the unit compact. This also ensures the light continues to function if for any reason one LED should fail.

Multiple Colors—Due to the use of two light sources, a combination of colors can be offered such as blue and green. This allows the invention to take on an infinite variation of colors and shadows as the viewing angle is changed. In order to balance the light output between different colored LEDs, the addition of a resistor between one of the LEDs may be required. This is done to ensure both LED's have a similar current draw on the batteries and one color is not favored over the other. Once the proper resistor has been selected it is hard wired into the circuitry.

Battery Label Design—In order to aide in the output of light, specialized battery labels of white or a reflective material are utilized. By minimizing the print area and utilizing the batteries as a reflective screen or convex mirror, the surface of the batteries will provide additional increases in light output over conventional AA batteries.

Low Overall Cost—While the initial purchase cost is higher than that of light sticks, its operating cost is considerably lower. Depending on the number of sets made, breakeven costs can be realized relatively quickly. The more sets made, the cheaper its operation becomes. Once the savings have been amortized into the purchase price of the light and breakeven is meet, the operating costs can become as much as eighty percent less than that of chemical lights.

The invention includes eyelets or holes in both the cap and base to allow a variety of attachment materials to be used. Monofilament with a snap or a cotter ring between the snap and light or just a snap attached directly to the light may all be used to connect the light to the leader line. The fisherman can change the direction of light to face either up or down by changing the hole through which the light is attached on the leader line.

FIG. 1 diagrammatically illustrates lighted fishing lure 10 having a first body part 12 which is removably attached to a second body part 14. First body part 12 has an end face 16 with an axially protruding member 18. Axially protruding member 18 includes a hole 19 therethrough which enables lighted fishing lure 10 to be attached to a longline fishing line. Lure 10 is generally cylindrical or frusto-conical end shape. From the side view illustrated in FIG. 1, lure 10 is cylindrical in shape but when viewed from another side, fishing lure 12 is frusto-conical in shape. See FIG. 11. Axial center line 21 is shown in FIG. 1.

Second body part 14 includes an end face 22 and an axially extending member 24 with an eyelet 25 to enable attachment to a longline fishing line. Body part 12 can rotate with respect to body part 14 as shown by double headed arrow 23.

When body parts 12, 14 are rotated to a release position or an OPEN (described later in connection with FIG. 4A) and body part 14 is axially withdrawn from body part 12, access to batteries 26, 27 is provided. Other battery shapes may be utilized. Cylindrical, AA alkaline batteries are preferably used in the lure.

FIG. 2 diagrammatically illustrates a partial, exploded view of the light wherein body part 14 is withdrawn from body part 12 and batteries 26, 27 have been removed from cavities 28, 29. LEDs 30, 32 extend into LED cavities 34, 36 formed in body part 12. The base 30a, 32b of each LED 30, 32 is shaped to conform to a particular cavity 34, 36 (FIG. 2) in body part 12 thereby ensuring that the operator correctly matches the polarity of batteries 26, 27 and the circuitry (described later) leading to LEDs 30, 32. LED 32 has a squared base 32b which fits within square cavity 36 and body part 12. LED 30 has a cylindrical base 30a which fits into cylindrical cavity 34.

The lighted fishing lure utilizes a light emitting device which, in a preferred embodiment, is a light emitting diode or LED. LEDs were selected because those devices emit light based upon electrical excitement of their elements, are low voltage level devices, are highly efficient light generators and do not generate heat. Further, LEDs are highly durable when used in the very adverse conditions of the present fishing lure. The light emitting devices subject to the present invention are not incandescent devices or fluorescent devices or devices which include tungsten filaments. Similar numerals designate similar items throughout the figures.

FIG. 3 diagrammatically illustrates an exploded view of the light showing major components or parts of the lighted fishing lure of the present invention. An O-ring 40 is disposed on one end region 42 of body part 12. Particularly, O-ring 40 is placed in groove 44 near end 42. The O-ring creates a watertight seal between body part 14 and body part 12. This O-ring always seals the lighted lure during ON, AUTO (pressure sensitive mode) and OFF control modes.

Batteries 26, 27 are placed in cavities 28, 29 such that opposing battery terminal ends are adjacent each other. Contact plate 44a is disposed at the internal end (not shown) of cavities 28, 29. Contact 44a connects the positive terminal of battery 27 (not shown) and the negative terminal of battery 26 (not shown) together.

Body part or cap 14 retains LED circuit board elements 45 which transfer electrical power from batteries 26, 27 to LEDs 30, 32. This circuit includes an insulated base 46, battery terminal members 48, 50 and circuit connectors 52, 54. Battery terminal members 48, 50 are placed on end regions 49, 51 of plate base 46. Terminals 48, 50 include U-shaped spring members which contact battery terminals 27a, 26a of batteries 26, 27. These U-shaped spring terminals are diagrammatically illustrated as disposed in cap or body part 14 in FIG. 2.

Insulating platform 46 is spring loaded in the interior of cap 14 via coil spring 60. Coil spring 60 rides on post 62 extending above platform 46. Loosely retained pins 64, 66 are mounted in through passages 68, 69 which limit the side to side or rocking movement of floating platform 46. Conductive elements 52, 54 close the electrical circuit formed by batteries 26, 27, conductive plate 44, battery terminals 48, 50, conductive plates 52, 54 and the electrical leads (one of which is lead 31) extending from LEDs 30, 32 when the system is ON.

Body part 12 includes cavities 70, 72 which hold hydrogen absorbing pellets. In a preferred embodiment, hydrogen absorbing pellets known as "getters," are placed in cavities 70, 72.

Figure 4A:
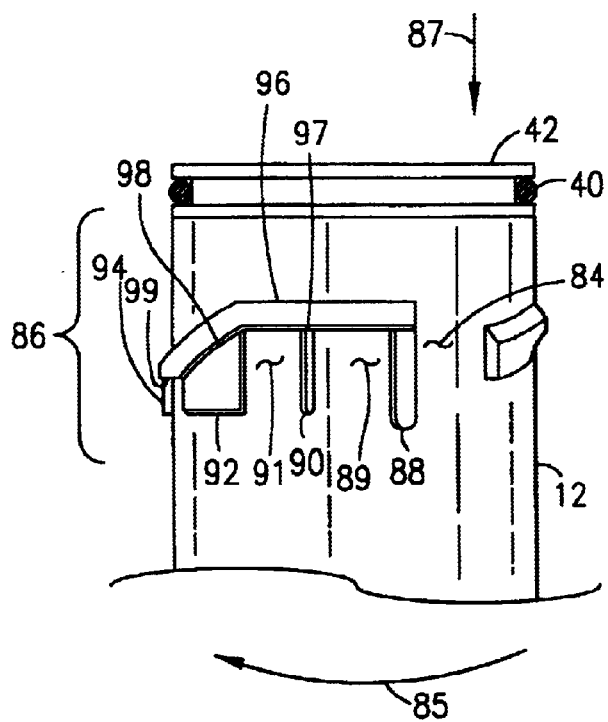
FIG. 4A diagrammatically illustrates a side view of the outside of one body part (the main body) forming the housing and FIG. 4B diagrammatically illustrates another cam control system.
Figure 5:
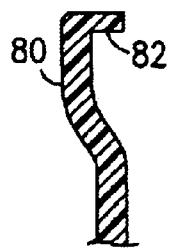
FIG. 5 diagrammatically illustrates the side arm of the other body part (the top) of the housing and shows a cam actuator member or finger.

FIG. 4A diagrammatically illustrates body part 12 having a plurality of cam surfaces thereon. FIG. 5 illustrates side arm 80 having a cam actuator surface or finger 82.

Figure 6:
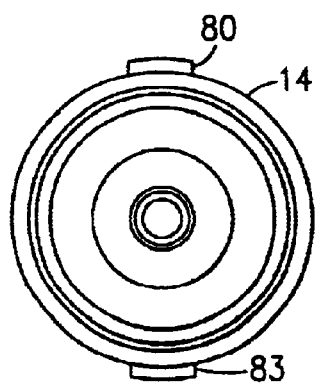
FIG. 6 diagrammatically illustrates an internal end view of the top body part of the housing.

FIG. 6 is an internal end view of body part or top 14 showing side arms 82, 83.

In order to place the body part 14 on main body part 12, side arm 80 and particularly cam actuator finger or surface 82 must be axially aligned with flat land area 84 (FIG. 4A) on the generally cylindrical end region 86 of main body part 12. By axially aligning side arm 80 and particularly cam actuator finger 82 with flat land 84 and axially moving body part 14 in the direction shown by arrow 87 in FIG. 4A, the axially alignment of cam actuator finger 82 and flat land 84 enables top body part 14 to be axially mounted onto main body part 12.

Body part 12 has slightly raised lands 88, 90, 92. Extreme rotational movement in the direction shown by arrow 85 is prohibited due to radially extending stop 94. A flat lands 89 and 91 are established between slightly raised lands 88, 90 and 92. Cam actuator finger 82 (FIG. 5) is adapted to move over slightly raised lands 88, 90 and 92 but the finger is configured to stop at rotational stop 94. In this manner, the operator by rotating body part or cap 14 with respect to main body 12, feels tactile responses when cam actuator finger 82 is located in flat land 89, intermediate raised lands 88 and 90, then enables a tactile response when cap 14 is rotated with respect to body 12 and cam actuator finger 82 passes over raised land 90 into flat land 91. Thereafter, the operator feels or obtains a tactile response by rotation of finger 82 over slightly raised land 92.

When finger 82 is in flat land 89, the lighted fishing lure is OFF. When finger 82 is in flat land 91, fishing lure is entering its AUTO or pressure sensitive control mode. When finger 82 is placed on slightly raised land 92, cap 14 is axially compressed and drawn to main body part 12. This reduces the axial length of the battery chambers or cavities and rotates pin 64 (FIGS. 7A and 7B) from low cam surface 59 to intermediate cam surface 61. In an OFF position, the batteries "shake" or are loosely retained in the cavities and do not simultaneously contact upper contact 44a and battery terminals 48, 50 because pins 64, 66 (FIG. 7A) do not force contact plates 48, 50 into contact with the battery terminals. Therefore, there is no closed electrical circuit. However, when cam actuator finger 82 is placed on land 92, cap 14 and body part 12 are still permitted to axially compress thereby forming a pressure sensitive control surface or surfaces and establishing a pressure sensitive switch. Pins 64, 66 are disposed on intermediate cam surfaces, e.g. pin 64 on surface 61 in FIG. 7B. The lighted fishing lure is designed such that, when the lure in the AUTO or pressure sensitive control mode, the system turns ON the LED or LEDs when the lure is approximately 10 feet or 3.0 m underwater. The pressure at this level compresses cap 14 and body part 12 together thereby reducing the axial size of battery cavities 28, 29, causing the batteries to simultaneously contact upper and lower battery terminals due to pins 64, 66 acting on contacts 48, 50 and establishing a closed electrical circuit with the batteries, the LEDs, battery terminals 48, 50 and conductor 44a when the water pressure exceeds the predetermined level. The lighted lure is constructed to withstand about 1,000 psi (about 2,300 feet below sea level).

Mechanically, a ridge or lip 96 (FIG. 4A) protrudes radially from main body part 12. A lower portion of rib 96 provides cam surfaces 97, 98, 99 which co-act with the cam actuator 82. When cam actuator finger 82 is acting on cam surface 97, the fishing lure light is OFF. When cam actuator finger 82 is acting on axially sloped cam surface 98, the pressure sensitive switch of the fishing lure is set to AUTO and the LEDs are turned ON or OFF based upon the ambient pressure underwater. Rotation of cap 14 with respect to body 12 causes pins 64, 66 to ride up o land 61 (FIG. 7B). In the third control mode (always ON), cam actuator finger 82 rides on cam surface 99 which establishes the maximum foreshortened position of top 14 with respect to body 12 and hence the maximum foreshortened position of the battery cavities 28, 29 and pins 64, 66 are raised by following cam surface 65 to their high up switch ON position. In this maximum foreshortened configuration and raised pin position, the LEDs are ON. The three way or tri-modal control of the lighted fishing lure is one of several important features of the present invention.

Another important feature of the present invention is to attach cap 14 onto body 12 in a bi-modal manner wherein, in the first mode when cam actuator finger 82 in is flat land 91 or raised land 92, the cap 14 is enabled to axially move with respect to body 12 based upon ambient pressure underwater. In a second mode of the removably attached, sealed, bi-modal configuration, axial movement of body part or cap 14 with respect to main body part 12 is prohibited. This mode is established when cam actuator finger 82 abuts and locks unto cam surface 99 which is axially inboard with respect to cam surface 97. When finger 82 abuts cam surface 99, no axial movement of cap 14 with respect to body 12 is permitted. As described above, in that second mechanical mode, the LEDs are ON. The cam actuator can be internal or external with respect to the housing. Also, the cam surfaces can be disposed on part 12 or part 14.

Figure 7A:
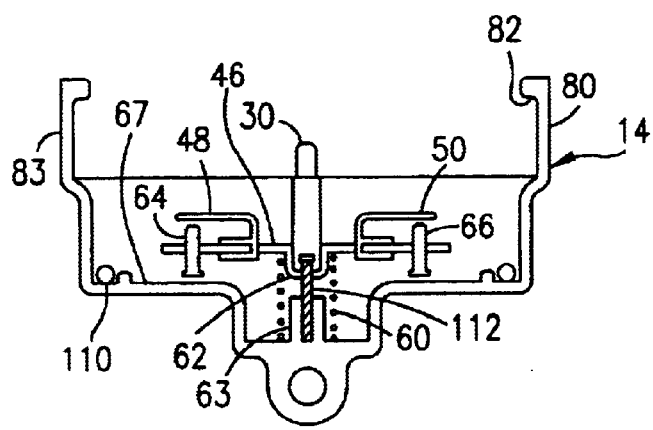
FIG. 7A diagrammatically illustrates a partial, cross-sectional view of the top body part.
Figure 7B:
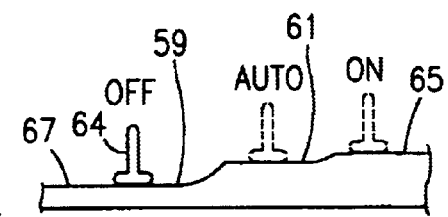
FIGS. 7B and 7C diagrammatically show switch pin cam follower positions on cam surfaces (plan views of arcuate cam surfaces which generally correspond to FIGS. 4A and 4B, respectively)

FIG. 7A shows a partial, cross-sectional view of end cap 14 and the electrical circuit 45 of LEDs 30, 32. Insulating platform 46 rides on spring 60 in the interior of cap 14. A spring loaded ride is caused by spring 60 loosely mounted on post 63 in the interior of cap 14 and post 62 depending from platform 46. A screw or other attachment 112 adjusts the degree of spring loading or float of platform 46. Platform 46 rotates on spring 60 due to keys 30a, 32b, and keyways 11a and 13a in main body housing 12 (see FIG. 3). Loosely retained cam follower pins 64, 66 are disposed axially beneath the U-shaped battery terminals 48, 50 to ensure that when pins rotate over cam surface 67 (see FIG. 7B), the pins force contacts 48, 50 upward to close the switch. Pins 64, 66 are loosely retained in holes 68, 69. See FIG. 3. The distal ends of floating pins 64, 66 are slightly flared such that the pins rotate over arcuate cam surface 67 as the platform 46 rotates with respect to end cap 14 and surface 67.

An additional O-ring 110 is disposed in an appropriate channel or groove in the internal end face of top 14. O-ring 110 is compressed by edge 112 (See FIG. 2) of the main body part. Accordingly, two watertight seals are provided for the lighted fishing lure. O-ring 110 is primarily effective in the ON control mode when the pressure exceeds the predetermined level underwater or when the system is manually turned ON.

Figure 8:
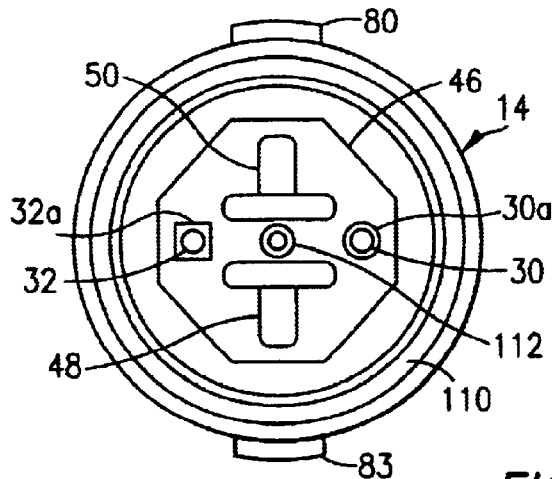
FIG. 8 diagrammatically illustrates an internal end view of the top body part shown in FIG. 7.

FIG. 8 diagrammatically illustrates an interior end view of top cap 14, battery terminals 48, 50 and LEDs 30, 32. The radial, outboard flare or U-shape of terminals 48, 50 is shown.

Bases 30a, 32a of the LED are keyed to internal keyways 11a, 13a (FIG. 3) such that (i) platform 46 (FIGS. 7A and 8) is interlocked with main housing 12 (FIG. 3) in only one position; (ii) the electronic circuit is established in a singular manner (if two LEDs of different color are used, resistors are typically required to balance light output from the LEDs); and (iii) platform 46 rotates based upon rotation of housing 12 with respect to cap 14.

FIGS. 7A and 7B are plan representations of arcuate cam surfaces on interior surface 67 of end cap 14. As pin 64 rotates due to linkage between platform 46 and housing 12 (see key and keyway sets 30a–11a and 32a–13a), the pins 64, 66 move over cam surface regions 59, 61 and 65 which move pins 64, 66 upward to strike contacts 48, 50 and close the electrical circuit with batteries 26, 27. At low level 59, the pin 64 does not force contact 48 into an electrical connection with the battery. The system is OFF. At intermediate cam surface 61, the pin 64 forces contact 48 to connect with the battery if pressure on the system compresses the battery cavity, foreshortens the cavity and closes the switch system. At high cam surface 65, the switch is closed due to pin 64 contacting element 48 and making an electrical connection.

Figure 4B:
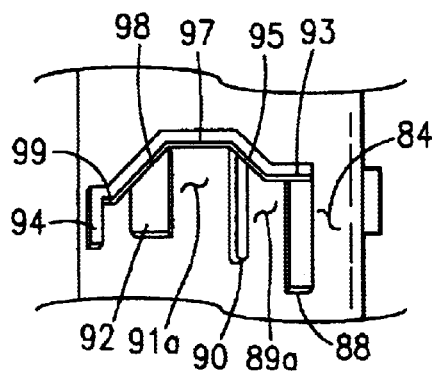

FIG. 4B shows a different exterior cam system with AUTO or pressure sensitive switch region at flat land 89a, OFF at flat land 91 a and ON at the intermediate raised land 92 and end stop 94.

Figure 7C:
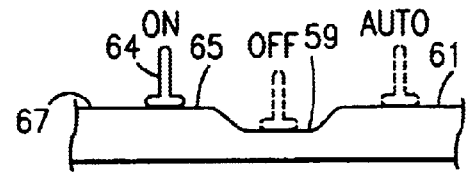

FIG. 7C shows the complementary switch cam surface with high cam surface 65 (ON), low cam surface 59 (OFF) and intermediate cam surface 61 (AUTO or pressure sensitive).

It should be noted that various switch cam systems may be utilized within the scope and spirit of the present invention. For example, cam surface may be defined on the outboard side or underside of contacts 48, 50, the contacts could be arcuate and a cam actuator (e.g., rod) could be fixed on end cap 14 protruding from inboard surface 67 to the underside of contacts 48, 50. The height of the cam surfaces on the underside of arcuate contacts 48, 50 may determine switch control ON, OFF or AUTO.

The key and keyways, e.g., 30a–11a, may be any shape, e.g., oval.

Figure 9:
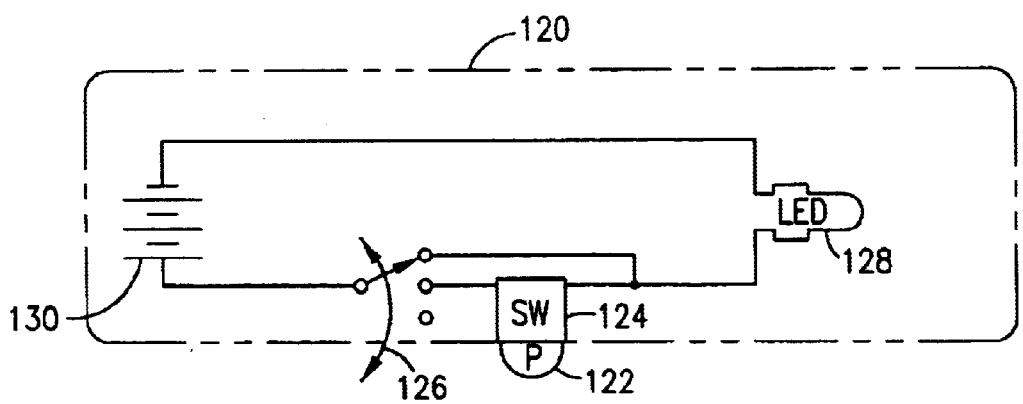
FIG. 9 diagrammatically illustrates a basic electrical schematic for a simple lighted fishing lure (one LED, a battery and two switches)

FIG. 9 diagrammatically illustrates an electrical schematic. The electrical components are mounted in a housing shown by dashed-dot-dashed line 120. Housing 120 seals the entire electrical system except pressure sensitive surface 122 associated with switch 124. Another switch, typically a manual switch 126, is a three position switch which turns the LED 128 ON (the system condition shown in FIG. 9) or enables the pressure sensitive switch 124 to control the LED (AUTO) or turns the system OFF. Battery 130 completes the electrical circuit. In a preferred embodiment, two batteries are utilized and two blue Nichia LEDs 30, 32 are utilized with no other resistive elements in the circuit. Green Nichia LEDs are also preferred. However, the system can be configured with a single LED 128 and a single battery 130. The system may include resistors to match the voltage to the LED. Other power conditioning circuit elements may be used. However, additional electrical components reduce power available to the LEDs.

The tri-state switch with ON, OFF and pressure sensitive ON states is an additional feature of the present invention. The pressure sensitive switch 124 must have a pressure sensitive control surface exposed to the ambient environment of housing 120. In a working embodiment, manual switch 126 is provided by the rotational movement of top 14 with respect to body 12 as described above in connection with FIGS. 4A, 5 and 6, among others. The pressure sensitive switch 124 is provided by cam actuator finger 82 placed on or near land 92 and axially inboard sloped cam surface 98 which enables the pressure in the ambient underwater environment to axially compress cap 14 with respect to body 12 and foreshorten battery cavities 28, 29, and the switch cam system (in FIG. 7B) moves contacts 48, 50 close to the batteries until batteries 26, 27 make electrical contact with both conductor plate 44 and battery terminals 48, 50. In the full ON position, the pins force contacts toward the batteries 26, 27 such that the batteries make electrical contact with plate 44 and terminals 48, 50.

FIG. 9 shows a simple electrical schematic with battery 130, three position switch 126, pressure sensitive switch 124 with pressure sensitive surface 122 and LED 128.

It should be noted that other types of switches may be utilized rather than the simple combined ON/OFF switch and pressure sensitive switch (AUTO) described in the current embodiment. A mechanical slide switch (properly sealed) could be placed on the housing 10 (FIG. 1) thereby providing the function of switch 126 in FIG. 9. Many pressure sensitive switches 124 can be utilized to enable the pressure sensitive control for LED 128. One example is a bladder actuated pressure switch. Singular or multiple LEDs may be incorporated into the present invention.

Figure 10:
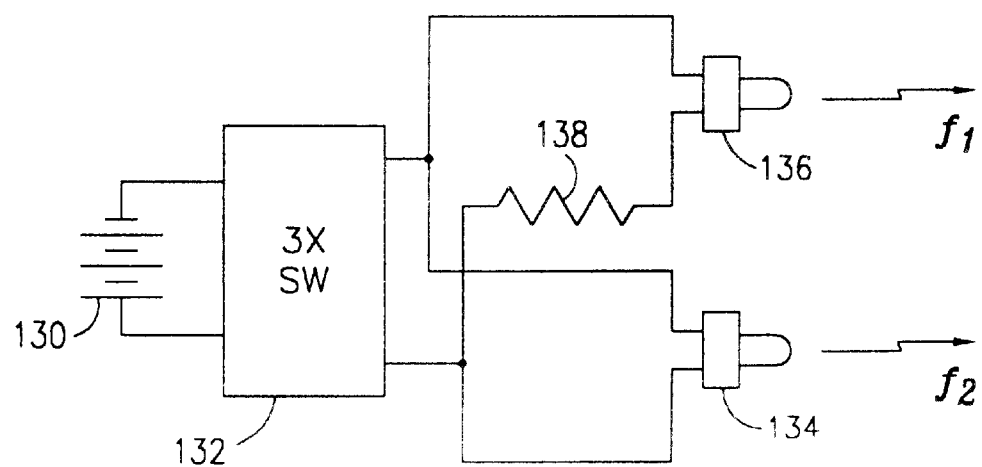
FIG. 10 diagrammatically illustrates an electrical schematic for a lighted fishing lure having two LEDs wherein each LED has a different color.

FIG. 10 is an electrical schematic showing battery 130, a three-way switch 132 and LEDs 134, 136. Three way switch 132 represents the ON, AUTO and OFF switch. LED 136 emits a light of one color or frequency $f_1$ and LED 134 emits a different color light having a different frequency $f_2$. A resistor 138 is disposed between LED 134 and 136 in order to reduce the voltage and equalize the light output from LED 136. A series of tests using different colored LEDs have established that different colored LEDs produce intensities of light. The intensity of light is measured as a Lux factor. Resistor 138 is required in order to somewhat equalize the light output of LED 136 as compared with LED 134. In a one preferred embodiment, two LEDs are utilized, each having the same color and hence frequency, and no resistors are utilized in the circuit. See FIG. 9. Market demands may require two lights of different color or other resistors.

During the design phase of the lighted fishing lure, a major problem arose with respect to light emitted by an LED. Generally, an LED emits light as a forward directed beam, i.e., emitting light in one direction, which is generally forward with respect to the LED itself. Since it is important, if not critical, that the lighted fishing lure emit light in substantially all directions, forward, aft and 360 degrees about its axial centerline, the optical characteristics of the fishing lure were significantly studied, modified and improved.

A lighted fishing lure in accordance with one important principle and one embodiment of the present invention must emit light with refraction, reflection and either diffusion or a multitude of reflection points in the housing.

Figure 11:
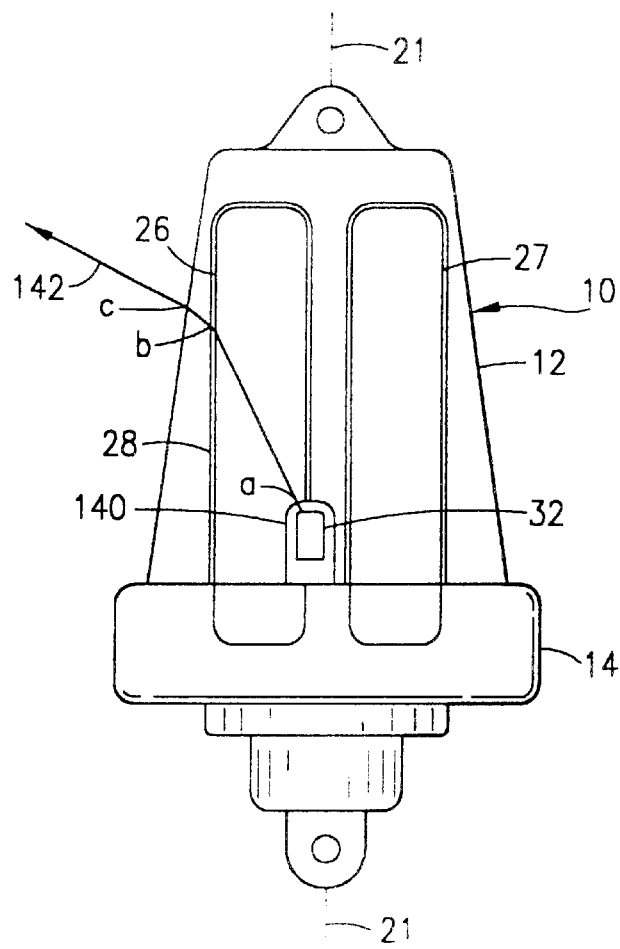
FIG. 11 diagrammatically illustrates a very simplistic representation of light refraction from the LED through the LED cavity, the battery cavity and the housing.

FIG. 11 diagrammatically shows lighted fishing lure 12 having an LED 32 and batteries 26, 27. Housing 10, consisting of body 12 and body or cap 14 is clear plastic. However, body 12 has an LED cavity 140 which enables refraction of an LED light beam 142 at the interface between cavity 140 and the transparent plastic of body 12. Refraction occurs when light travels through two media each having a different index of refraction. When the light passes through battery cavity 28, the LED light beam 142 is again refracted at the cavity wall. When LED light beam 142 exits body 12, the beam is again refracted at the housing wall. Accordingly, the single illustrated beam 142 is refracted at points a, b and c in FIG. 11. Accordingly, the shape of lighted fishing lure 10 is designed to refract the multitude of generally forward directed light beams from LED 32. Hence, the frusto-conical shape of body 12 and the LED cavities and the battery cavities increase light refraction, among other things. Of course, there is a plurality of LED light beams in addition to light beam 142 emanating from LED 32 in FIG. 11.

FIG. 12A diagrammatically shows light reflection from battery 27. In this figure, LED 32 emits a light beam 150. Light beam 150 is reflected from battery 27 due to a light reflective surface on the battery. The light reflective surface is silver or mirror or mirrored film or white. Coating the battery cavity achieves the same result. That light beam after reflection from battery 27 ultimately exits body 12 as beam 150. LED 32 also emits a light beam 152 which is reflected off a different part of battery 27. In this sense, battery 27 acts as a convex mirror surface to achieve reflection of LED light from the lighted fishing lure 10. A reflective sleeve may be placed about the battery. The sleeve acts as a coating to reflect the light. The sleeve defines a reflective light surface of the battery as does a reflective coating over the battery cavity.

FIG. 12B shows LED 32 emitting reflected light beams 154, 156 and 158. The reflected light is reflected 360 degrees except for the shadow of the battery opposite LED 32. FIG. 12C shows a battery 27 transversely disposed with respect to the LED and reflected light 153 and non-reflected light 151.

In FIG. 12D, LEDs 30, 32 emit light beams 162, 164 and 166 (from LED 30) and beams 168, 170 (from LED 32). In this manner, two LEDs and a single battery can generate reflective light in a substantially 360 degree manner about the lighted fishing lure housing. Although two batteries are shown in the preferred embodiment, a single battery may be sufficient. When the reflective principle is combined with the refraction shown in FIG. 11, light emission from all directions (to all three dimensions, the x axis, y axis and z axis) is achieved by the fishing lure of the present invention.

Figure 13:
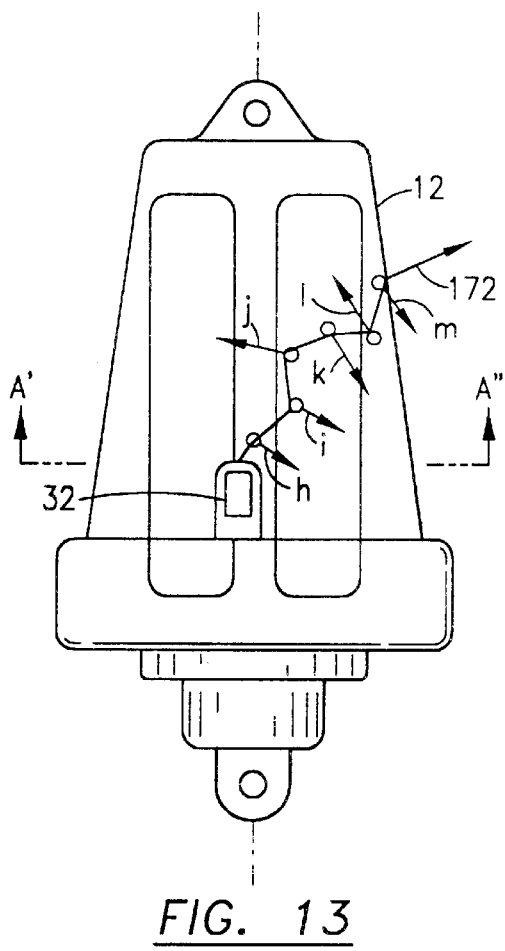
FIG. 13 diagrammatically illustrates light diffusion through the lighted fishing lure housing.
Figure 14A:
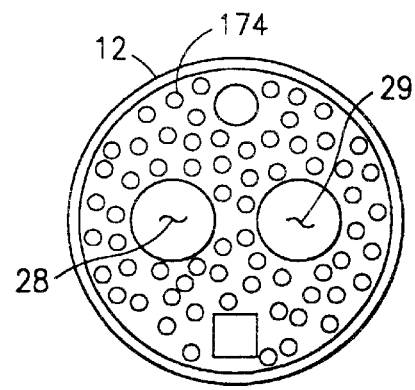
FIGS. 14A and 14B diagrammatically illustrate dispersion of light with diffusing optical elements distributed in the housing and a simplistic light diffusion diagram, respectively.

FIG. 13 shows LED 32 emitting light beam 172 that is diffused on six (6) different occasions by striking an element embedded in housing 12 or bubbles or voids formed in the housing. Diffracted light beams h, i, j, k, l, m are also generated by light beam 172. Diffraction occurs when a light beam travels from one medium having a certain index of refraction into another medium having a different index of refraction or it strikes a diffractive optical element. FIG. 14A shows a cross-section of housing 12 from the perspective of section line a'–a" in FIG. 13. A plurality of light diffusing optical elements, one of which is element 174 is disbursed throughout housing 12. In one embodiment, the housing has a first index of refraction and the light diffusing element has a second or different index of refraction.

Diffraction is caused by typically one, but possibly two or more of the following:

glass beads
glass fiber
glass rods
glass particles
small amounts of translucent color (e.g., $TiO_2$)
voids or bubbles in the housing (caused by blowing agents)

Although the light diffusing bubble is not, in a purse sense, a structural member, the void or bubble is an optical element that diffuses light. The translucent color is also a light diffusing optical element.

Figure 14B:
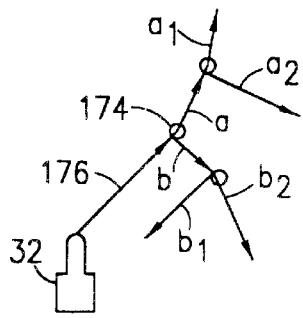

FIG. 14B shows LED 32 emitting light ray 174. Light ray 174 strikes an interface between transparent housing body 12 and a light diffusing element 174. This light diffusing element splits the beam into sub-beams a and b. Beam a strikes another light diffusing element and splits into beams $a_1$, $a_2$. Beam b strikes another light diffusing element and splits into beams $b_1$ and $b_2$. In this manner, the diffusing element scatters or disburses the light in a multitude of directions.

Figure 15B:
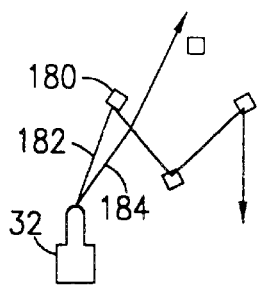
FIGS. 15A and 15B diagrammatically illustrate the use of light reflecting materials such as glitter dispersed through the housing and a simplified light diagram showing light reflection from the glitter; and, FIGS. 16A and 16B diagrammatically illustrate the emission of light 360 degrees in the x, y and z axes (FIG. 16B) from the lighted fishing lure.
Figure 15A:
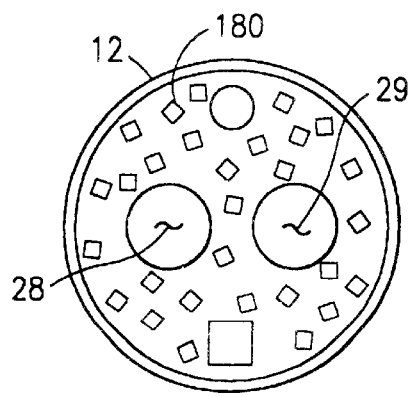

FIG. 15A shows body 12 having plurality of light reflective optical material disbursed throughout. One light reflective optical material is material, particle or chip 180. In a preferred embodiment, material 180 is glitter. Glitter is a small element or discrete component having a reflective surface thereon (e.g. plastic or metal flakes). In FIG. 15B, LED 32 emits beams 182 and 184. Beam 182 is reflected by light reflective material or glitter 180 three times before it exits the housing. In contrast, LED light beam 184 proceeds directly through the housing without being reflected.

Figure 16A:
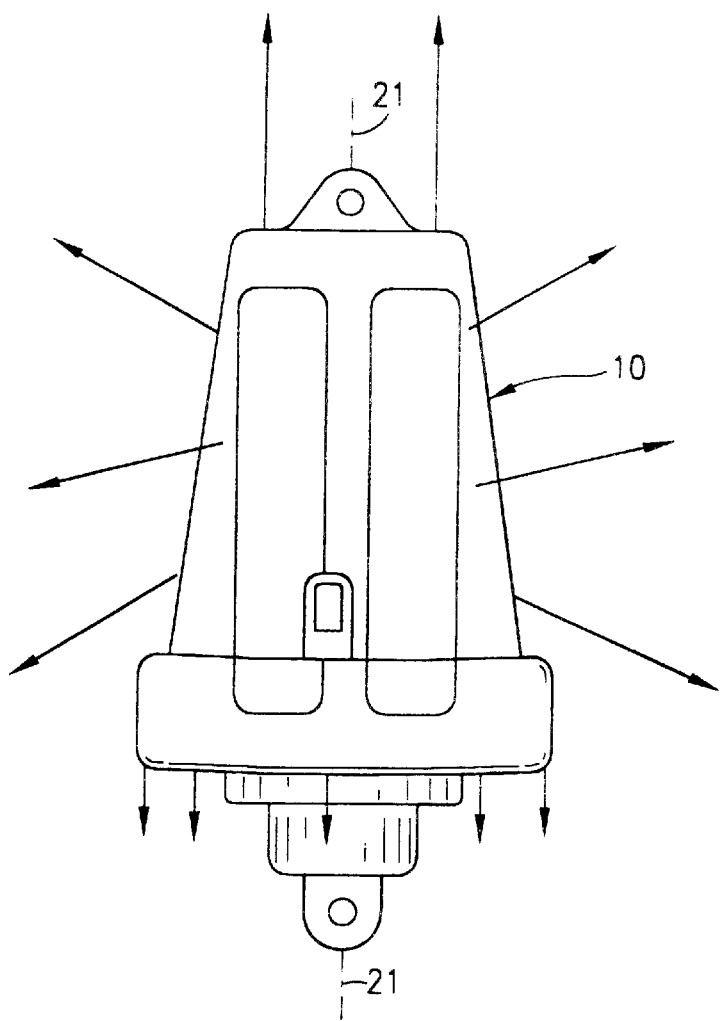
Figure 16B:
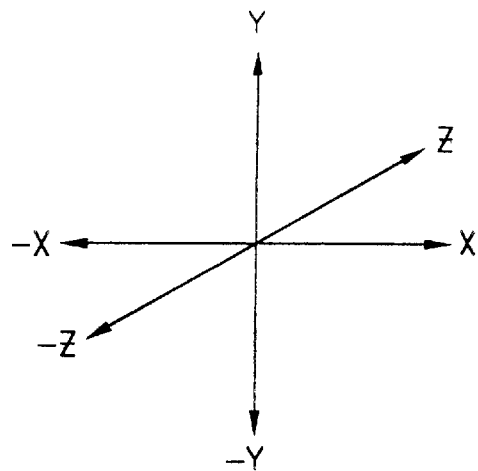

FIG. 16A shows lighted fishing lure 10 emitting light in substantially all directions, that is, forward and aft (see FIG. 16B, over the positive and negative x axis) and 360 degrees around central axis 21 (in the y axis and the z axis which fall in a plane perpendicular to the x axis). An important feature of the present invention is to refract, reflect and diffuse the light through the housing thereby causing the emission of light in all directions, forward, aft and 360 degrees about the lighted fishing lure.

In order to establish that the lighted fishing lure emits light in all directions, various tests were conducted on different light modifier (diffusers and/or reflectors) designs. Light output tests of lighted lures (based upon Lux measurements) do not seem to clearly establish the best combination of LEDs, batteries, voltage levels, glitter types or sizes or colors, LED colors (blue or green), refractive additive material (glass beads) or sizes of the refractive material glass beads. At certain voltage levels, Meadowbook #322, 0.8 ml, glitter seems to generate a high Lux output but at other voltage levels, different glitter generates more output (Glitterex 0.088 silver-glow). The same variations were found with respect to glass beads. Different glass beads from different manufactures, tested along and in combination with different beads, inconsistently generated different light outputs based upon the color of the LED and the voltage level applied thereto. Glass-small at 0.2 ml–0.8 ml; Glass-road, and combinations thereof at different colors and voltages reveal inconsistent results. These tests with light modifiers (glass beads for refraction and glitter for reflection) reveal that there are many combinations available which implement the principles of the present invention. Hence, design considerations, power consumption, LED color and the cost of the constituent components significantly impact a designer's or manufacturer's choice. At this time, there does not seem to be a preferred embodiment utilizing light modifiers (diffusing elements and/or a plurality of reflective elements). However, tests show that all light modifiers perform better (generate significantly higher light output (almost doubling Lux output)) than clear, unmodified housing.

To establish that a reflective surface battery better disperses the LED light, multiple tests were conducted. A summary of these tests is set forth below in the Reflective Battery Surface Table. This Table shows that a battery having a reflective film or a white cover or coating generated higher light output in Lux as compared with a substantially "black" battery (the DURACELL battery).

| Reflective Battery Surface Table | |
|---|---|
| Reflective Film | |
| Blue | 17.00 lux average |
| Green | 29.58 lux average |
| White | |
| Blue | 16.56 lux average |
| Green | 28.26 lux average |

| -continued | |
|---|---|
| Reflective Battery Surface Table | |
| Standard Duracell Battery (primarily black body) | |
| Blue | 13.50 lux average |
| Green | 22.81 lux average |

Tests have shown significant variations in light output from LEDs emitting different colored light and LEDs from different manufacturers.

The Lux output from the same color LED from different manufacturers and the of light output from different colored LEDs varies from 3.1–13.52, 12–52, and 6.4–12.80 for blue, green and the combination blue-green lure, respectively. The Time To Less Then One Lux Table below shows the wide range of time, in hours, for a specified LED system (blue, green or the combination of blue and green) to "decay" or drop from its initial light output level (not specified) to an arbitrarily selected light output of one (1) Lux. Different LEDs from different manufacturers were included in this test. Also, different batteries were included in the tests.

| Time to Less than One Lux Table |
|---|
| 506–769 hours - Blue LED |
| 411–1205 hours - Green LED |
| 785–1369 hours - Blue and Green LEDs |

These tests show that LED and battery combinations should be selected to achieve the "best fit" for the lighted fishing lure product based upon price, availability and manufacturer's specifications. The tests show that an LED light system in the lighted fishing lure has an extremely long ON life or useful product life. The tests also reveal that diffusion material, refraction material and reflection material (e.g., glass beads and glitter and reflective battery surface or covers) have a dramatic effect on the light output. The cost of the constituent elements of the lighted fishing lure is a factor to consider. The cost may effect the performance of the product. As explained above, the use of resistors may be required to balance the light output or match the LED to the battery voltage level, but these resistors drain power from the battery and ultimately decrease the "useful life" or ON time of the lighted fishing lure. Performance tests matching LED products from different manufacturers with different batteries and different circuit designs establish that a manufacturer can produce a reasonably priced lighted lure, producing an adequate light output over a reasonable time period or ON time in accordance with the principles of the present invention.

The claims appended hereto are meant to cover modifications and changes within the scope and spirit of the present invention.

What is claimed is:

1. An underwater battery powered lighted fishing lure comprising:

a transparent housing having at least one battery cavity and at least one light emitting device cavity and first and second body parts;

a battery disposed in said at least one battery cavity;

a light emitting diode disposed in said at least one device cavity;

an electrical circuit coupling said battery and said light emitting diode; and, an ambient pressure sensitive switch having a pressure sensitive mode and a static mode, said pressure sensitive switch adopted to be exposed to an ambient underwater environment, said pressure sensitive switch operative in conjunction with said first and second body parts, said pressure switch electrically coupled in said circuit to turn ON and OFF said light emitting diode;

said first and second body parts being movably coupled together with a water-tight seal, in said pressure sensitive mode, said first body part moves with respect to said second body part due to an ambient underwater pressure, and, in said static mode, said first and second body parts do not move with respect to each other notwithstanding the presence or absence of said ambient underwater pressure.

2. An underwater lighted fishing lure as claimed in claim 1 wherein in said static mode, said light emitting diode is ON.

3. An underwater lighted fishing lure as claimed in claim 2 wherein said transparent housing has disposed therein a plurality of light emitting diodes, said plurality of light emitting diodes electrically coupled together with said battery and said switch.

4. An underwater lighted fishing lure as claimed in claim 3 wherein said battery has a light reflective surface and light from said light emitting diode is reflected by said battery and refracted by said housing.

5. An underwater lighted fishing lure as claimed in claim 4 wherein at least one of said plurality of light emitting diodes emits colored light.

6. An underwater lighted fishing lure as claimed in claim 1 wherein said pressure sensitive switch is formed by compression of one of said cavities of said transparent housing.

7. An underwater lighted fishing lure as claimed in claim 1 wherein when said switch is in said pressure sensitive mode, said light emitting diode is ON when said housing is at or below a predetermined depth underwater.

8. An underwater lighted fishing lure as claimed in claim 7 wherein said pressure sensitive mode is operative to turn ON said light emitting diode when said housing is at or below about 10 feet underwater.

9. An underwater lighted fishing lure as claimed in claim 1 wherein said transparent housing has disposed therein a plurality of light emitting diodes, said plurality of light emitting diodes electrically coupled together with said battery and said switch.

10. An underwater lighted fishing lure as claimed in claim 1 wherein said battery has a light reflective surface and light from said light emitting diode is reflected by said battery and refracted by said housing.

11. An underwater lighted fishing lure as claimed in claim 10 wherein said pressure sensitive switch is formed by compression of one of said cavities of said transparent housing.

12. An underwater lighted fishing lure as claimed in claim 11 wherein when said switch is in said pressure sensitive mode, said light emitting diode is ON when said housing is at or below a predetermined depth underwater.

13. An underwater lighted fishing lure as claimed in claim 12 wherein said pressure sensitive mode is operative to turn ON said light emitting diode when said housing is at or below about 10 feet underwater.

14. An underwater lighted fishing lure as claimed in claim 13 wherein at least one of said plurality of light emitting diodes emits colored light.

15. An underwater lighted fishing lure as claimed in claim 1 wherein at least one of said plurality of light emitting diodes emits colored light.

16. An underwater lighted fishing lure as claimed in claim 15 wherein said pressure sensitive switch is formed by compression of one of said cavities of said transparent housing.

17. An underwater lighted fishing lure as claimed in claim 16 wherein when said switch is in said pressure sensitive mode, said light emitting diode is ON when said housing is at or below a predetermined depth underwater.

18. An underwater lighted fishing lure as claimed in claim 17 wherein said pressure sensitive mode is operative to turn ON said light emitting diode when said housing is at or below about 10 feet underwater.

19. An underwater lighted fishing lure as claimed in claim 18 wherein said battery has a light reflective surface and light from said light emitting diode is reflected by said battery and refracted by said housing.

\* \* \* \* \*